(12) United States Patent
Shimamura et al.

(10) Patent No.: US 9,413,037 B2
(45) Date of Patent: Aug. 9, 2016

(54) CELL CAPACITY ADJUSTING DEVICE

(75) Inventors: Koji Shimamura, Chiyoda-ku (JP);
Toru Morita, Chiyoda-ku (JP);
Toshinori Matsui, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 786 days.

(21) Appl. No.: 13/519,504

(22) PCT Filed: Feb. 4, 2011

(86) PCT No.: PCT/JP2011/052349
§ 371 (c)(1),
(2), (4) Date: Jun. 27, 2012

(87) PCT Pub. No.: WO2011/102241
PCT Pub. Date: Aug. 25, 2011

(65) Prior Publication Data
US 2012/0293003 A1    Nov. 22, 2012

(30) Foreign Application Priority Data

Feb. 16, 2010   (JP) ................................. 2010-031063

(51) Int. Cl.
*H02J 7/00*   (2006.01)
*H01M 10/42*   (2006.01)
*H01M 10/052*   (2010.01)
*H01M 10/44*   (2006.01)

(52) U.S. Cl.
CPC ........ *H01M 10/4207* (2013.01); *H01M 10/052* (2013.01); *H01M 10/441* (2013.01); *H02J 7/0016* (2013.01); *Y02E 60/122* (2013.01);
(Continued)

(58) Field of Classification Search
CPC ................................................ H02J 2007/0095
USPC .................................................. 320/120, 121
See application file for complete search history.

(56) References Cited

U.S. PATENT DOCUMENTS

| 5,656,915 | A | * | 8/1997 | Eaves .................. H01M 10/482 320/118 |
| 5,931,245 | A | * | 8/1999 | Uetake ...................... B60L 3/00 180/65.8 |
| 5,998,969 | A |   | 12/1999 | Tsuji et al. |

(Continued)

FOREIGN PATENT DOCUMENTS

| JP | 10-322925 A | 12/1998 |
| JP | 2000-050516 A | 2/2000 |

(Continued)

*Primary Examiner* — Richard Isla Rodas
*Assistant Examiner* — David V Henze-Gongola
(74) *Attorney, Agent, or Firm* — Sughrue Mion, PLLC

(57) ABSTRACT

Provided is a cell capacity adjusting device for reducing fluctuations in state of charge (SOC) among cells of a battery pack 101, which is formed by connecting a plurality of cells 111-116 in series, during suspension of operation of electrically-powered equipment whose main power source is the battery pack 101. From among the plurality of cells 111-116, one or a plurality of cells having a voltage value equal to or higher than a cell capacity adjustment target voltage are selected. By the selected cells, an intermittent operation unit 105, which operates even during the suspension of operation of the electrically-powered equipment, is caused to perform an intermittent operation. Through repetition of the intermittent operation, voltage values of the selected cells are decreased. Thus, fluctuations in state of charge (SOC) among cells are reduced without unnecessarily discharging battery stored energy of the battery pack 101.

7 Claims, 5 Drawing Sheets

(52) U.S. Cl.
CPC .......... *Y02T10/7011* (2013.01); *Y02T 10/7055* (2013.01); *Y10T 307/685* (2015.04)

(56) References Cited

U.S. PATENT DOCUMENTS

2002/0011820 A1* 1/2002 Suzuki ................. H02J 7/0014
　　　　　　　　　　　　　　　　　　　　320/132
2005/0023054 A1* 2/2005 Weidenheimer .......... F41B 6/00
　　　　　　　　　　　　　　　　　　　　180/65.25
2009/0085522 A1* 4/2009 Matsumoto ........... B60L 11/182
　　　　　　　　　　　　　　　　　　　　320/137

FOREIGN PATENT DOCUMENTS

| | | |
|---|---|---|
| JP | 2003-339122 A | 11/2003 |
| JP | 2004-236474 A | 8/2004 |
| JP | 3709766 B2 | 10/2005 |
| JP | 2009-142071 A | 6/2009 |

* cited by examiner

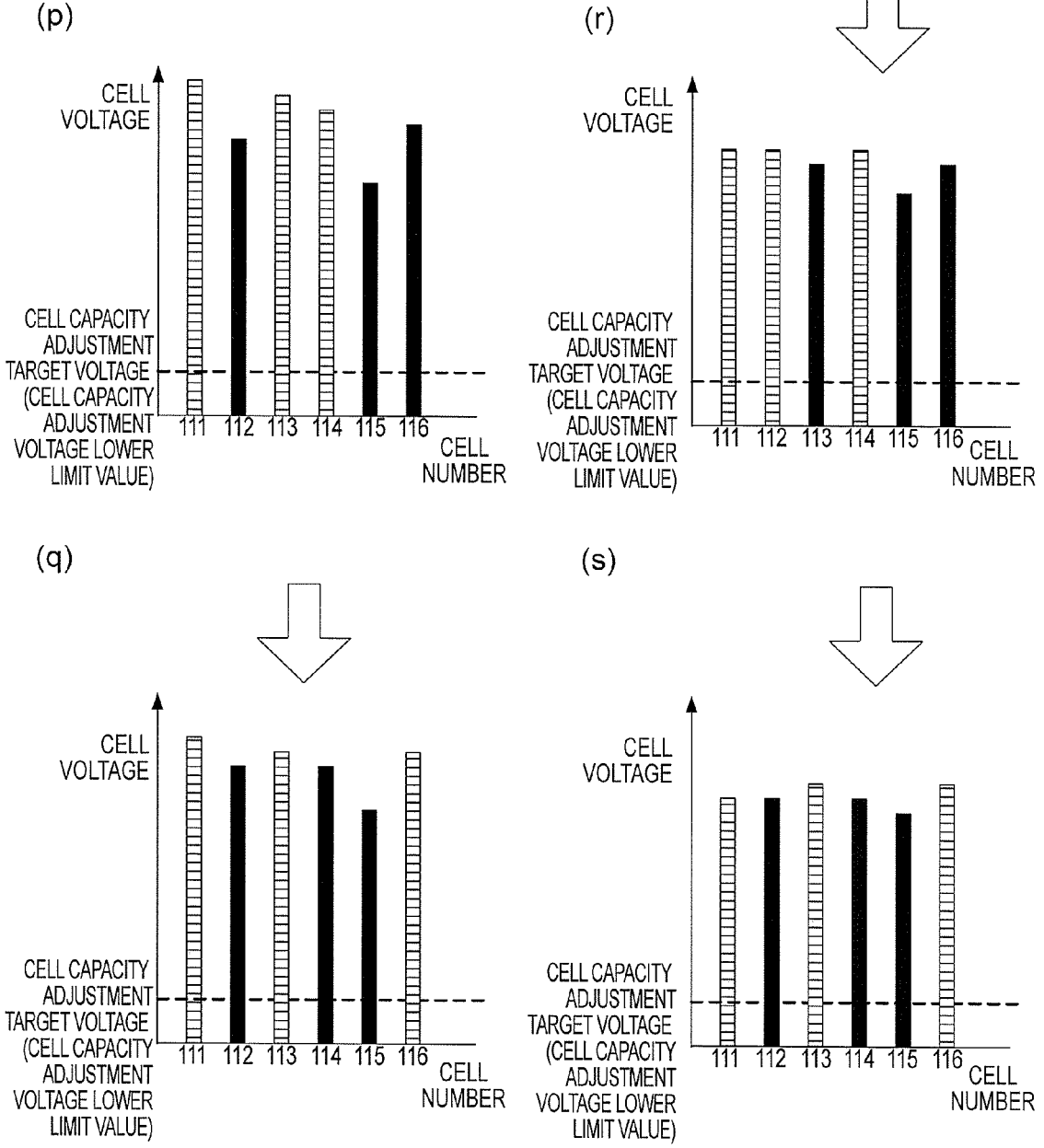

CELL CAPACITY ADJUSTING DEVICE

CROSS REFERENCE TO RELATED APPLICATIONS

This application is a National Stage of International Application No. PCT/JP2011/052349 filed on Feb. 4, 2011, which claims priority from Japanese Patent Application No. 2010-031063, filed on Feb. 16, 2010, the contents of all of which are incorporated herein by reference in their entirety.

TECHNICAL FIELD

The present invention relates to a cell capacity adjusting device, and more particularly, to a device for performing capacity adjustment among cells of a battery pack including a plurality of cells.

BACKGROUND ART

For a battery pack including a plurality of cells, in order to prevent overdischarge and overcharge caused by fluctuations in state of charge (SOC) among the cells, a technology of performing capacity adjustment depending on the fluctuations among the cells to equalize the capacities is conventionally known (see, for example, Patent Literature 1).

In this technology, a discharge circuit is provided for each of a plurality of cells constituting a battery pack, and a cell having a higher state of charge (SOC) is discharged so that the state of charge (SOC) of the cell may be coincident with state of charge (SOC) of cells having lower state of charge (SOC), to thereby adjust the state of charge (SOC) to be equal to one another.

CITATION LIST

Patent Literature

Patent Literature 1: JP 3709766 B

SUMMARY OF INVENTION

Technical Problem

In the above-mentioned technology, however, the cell having a relatively high state of charge (SOC) is discharged by using a discharge resistor so that energy of the cell may be transformed into heat, to thereby converge the state of charge (SOC) of the cell to a value of cells having lower state of charge (SOC). Therefore, there is a problem that battery stored energy of the cell is lost uselessly.

The present invention has been made in order to solve the problem described above, and it is an object thereof to provide a cell capacity adjusting device capable of reducing fluctuations in state of charge (SOC) among cells while making effective use of battery stored energy.

Solution to Problem

The present invention provides a cell capacity adjusting device for reducing fluctuations in state of charge (SOC) among cells of a battery pack, which is formed by connecting a plurality of cells in series, during suspension of operation of electrically-powered equipment whose main power source is the battery pack, the cell capacity adjusting device including: cell capacity target value setting means for setting a cell capacity adjustment target voltage; cell selection means for detecting an open-circuit voltage of each of the cells of the battery pack, and selecting a predetermined number of cells from among cells having a voltage value equal to or higher than the cell capacity adjustment target voltage; cell connection switch means for connecting the predetermined number of cells selected by the cell selection means to a unit which operates even during the suspension of the operation of the electrically-powered equipment, thereby supplying power from the selected predetermined number of cells to the unit; and intermittent operation control means for repeating turning ON and OFF the cell connection switch means every predetermined period, thereby causing the unit to perform an intermittent operation, in which the intermittent operation of the unit is repeated until voltage values of all the cells become equal to or lower than the cell capacity adjustment target voltage during the suspension of the operation of the electrically-powered equipment.

Advantageous Effects of Invention

The present invention provides a cell capacity adjusting device for reducing fluctuations in state of charge (SOC) among cells of a battery pack, which is formed by connecting a plurality of cells in series, during suspension of operation of electrically-powered equipment whose main power source is the battery pack, the cell capacity adjusting device including: cell capacity target value setting means for setting a cell capacity adjustment target voltage; cell selection means for detecting an open-circuit voltage of each of the cells of the battery pack, and selecting a predetermined number of cells from among cells having a voltage value equal to or higher than the cell capacity adjustment target voltage; cell connection switch means for connecting the predetermined number of cells selected by the cell selection means to a unit which operates even during the suspension of the operation of the electrically-powered equipment, thereby supplying power from the selected predetermined number of cells to the unit; and intermittent operation control means for repeating turning ON and OFF the cell connection switch means every predetermined period, thereby causing the unit to perform an intermittent operation, in which the intermittent operation of the unit is repeated until voltage values of all the cells become equal to or lower than the cell capacity adjustment target voltage during the suspension of the operation of the electrically-powered equipment. According to the intermittent operation, fluctuations in state of charge (SOC) among cells are reduced while making effective use of battery stored energy.

BRIEF DESCRIPTION OF DRAWINGS

FIG. 5 Explanatory graphs showing a transition of each cell voltage during the capacity adjustment control by the cell capacity adjusting device according to the second embodiment of the present invention.

DESCRIPTION OF EMBODIMENTS

Hereinafter, embodiments of the present invention are described with reference to the drawings.

First Embodiment

Figure 1:
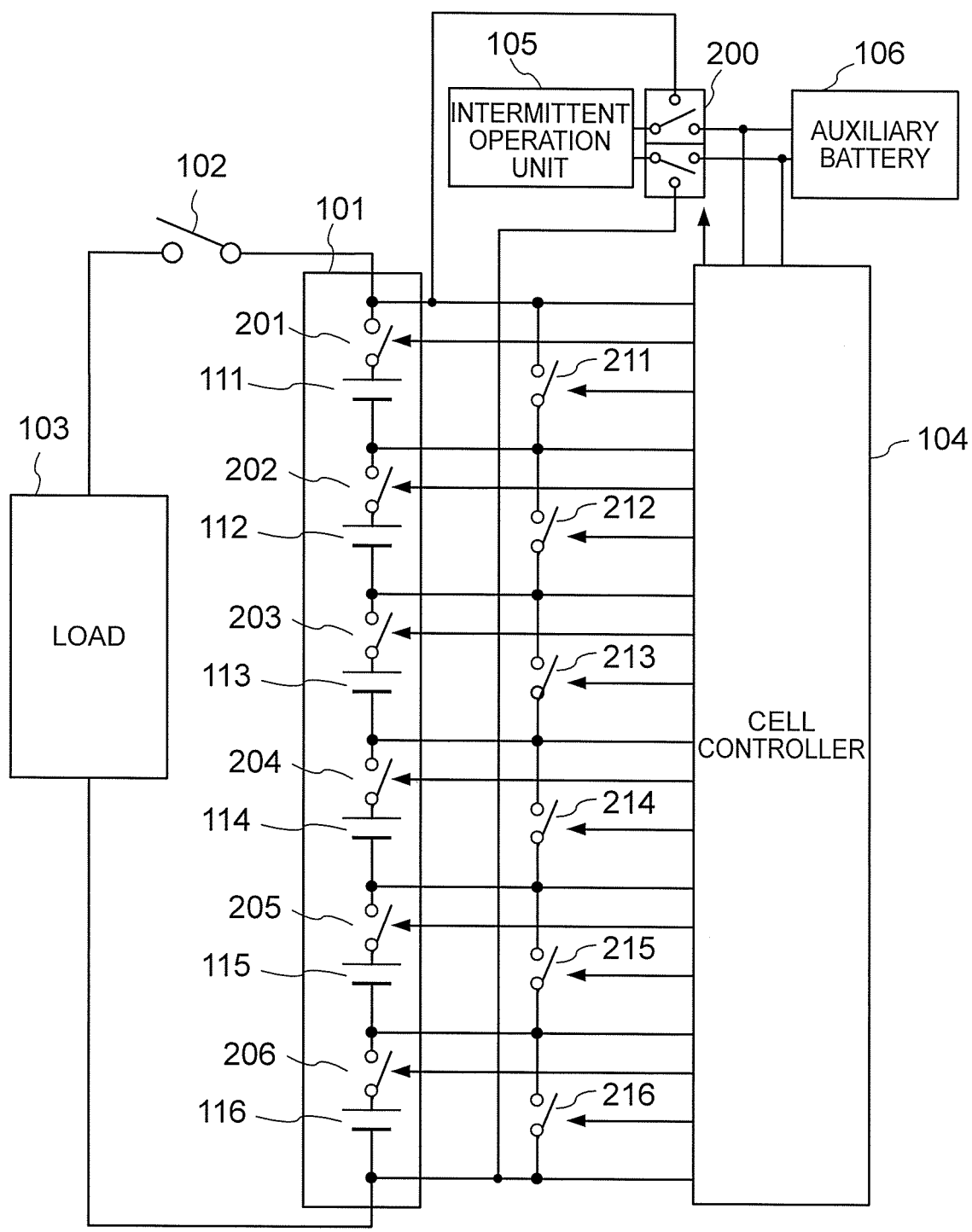
FIG. 1 A block diagram illustrating a configuration of a cell capacity adjusting device according to first and second embodiments of the present invention.

FIG. 1 is a diagram illustrating a configuration of a cell capacity adjusting device according to a first embodiment of the present invention. Note that, in the following, like reference symbols in FIGS. 1 to 5 denote like or equivalent portions.

The cell capacity adjusting device of the present invention is mounted in electrically-powered equipment, such as an electric vehicle. Electrically-powered equipment uses a battery pack formed by connecting a plurality of cells in series as a main power source. The cell capacity adjusting device of the present invention reduces fluctuations in state of charge (SOC) among the cells of the battery pack during suspension of operation of the electrically-powered equipment.

In this embodiment, as illustrated in FIG. 1, a battery pack 101 is a battery, typified by a lithium-ion battery, in which there is a certain proportional relationship between a state of charge (SOC) and an open-circuit voltage. The battery pack 101 includes a plurality of series-connected cells 111, 112, 113, 114, 115, and 116. Each of the cells 111 to 116 is rechargeable. The battery pack 101 is connected to a load 103, such as a drive motor, via a main switch 102. The battery pack 101 supplies DC power to the load 103.

Both terminals of each of the cells 111 to 116 are connected to a cell controller 104. The cell controller 104 includes a cell voltage detection circuit (not shown). The cell controller 104 detects an open-circuit voltage of each of the cells 111 to 116 by the cell voltage detection circuit.

The cells 111 to 116 are connected in series to switches 201 to 206, respectively. The cells 111 to 116 are further connected in parallel to switches 211 to 216, respectively. Open/close operations of the switches 201 to 206 and the switches 211 to 216 are controlled by the cell controller 104.

An intermittent operation unit 105 operates even during the suspension of operation of the electrically-powered equipment. The intermittent operation unit 105 has low power consumption. An example of the intermittent operation unit 105 includes a unit, typified by a vehicle security unit and a keyless entry unit, which operates even during vehicle parking (that is, during the suspension of operation of the electrically-powered equipment). The intermittent operation unit 105 is connected to a switch 200. When the switch 200 is switched, it is selected whether the intermittent operation unit 105 is supplied with power from the battery pack 101 or power from an auxiliary battery 106. The switching operation of the switch 200 is controlled by the cell controller 104. The auxiliary battery 106 is a lead-acid battery, for example. The auxiliary battery 106 supplies power also to the cell controller 104.

Note that, the cell controller 104 includes an internal circuit for control in addition to the above-mentioned cell voltage detection circuit, but those circuits are omitted in FIG. 1.

Next, a method of reducing fluctuations in state of charge (SOC) among cells in the cell capacity adjusting device according to the first embodiment is described with reference to the drawings. The cell capacity adjusting device causes, during vehicle parking, the intermittent operation unit 105 to operate with one or a plurality of cells included in the battery pack 101 and repeat an intermittent operation of the cells, thereby reducing the fluctuations in state of charge (SOC) among the cells.

Figure 2:
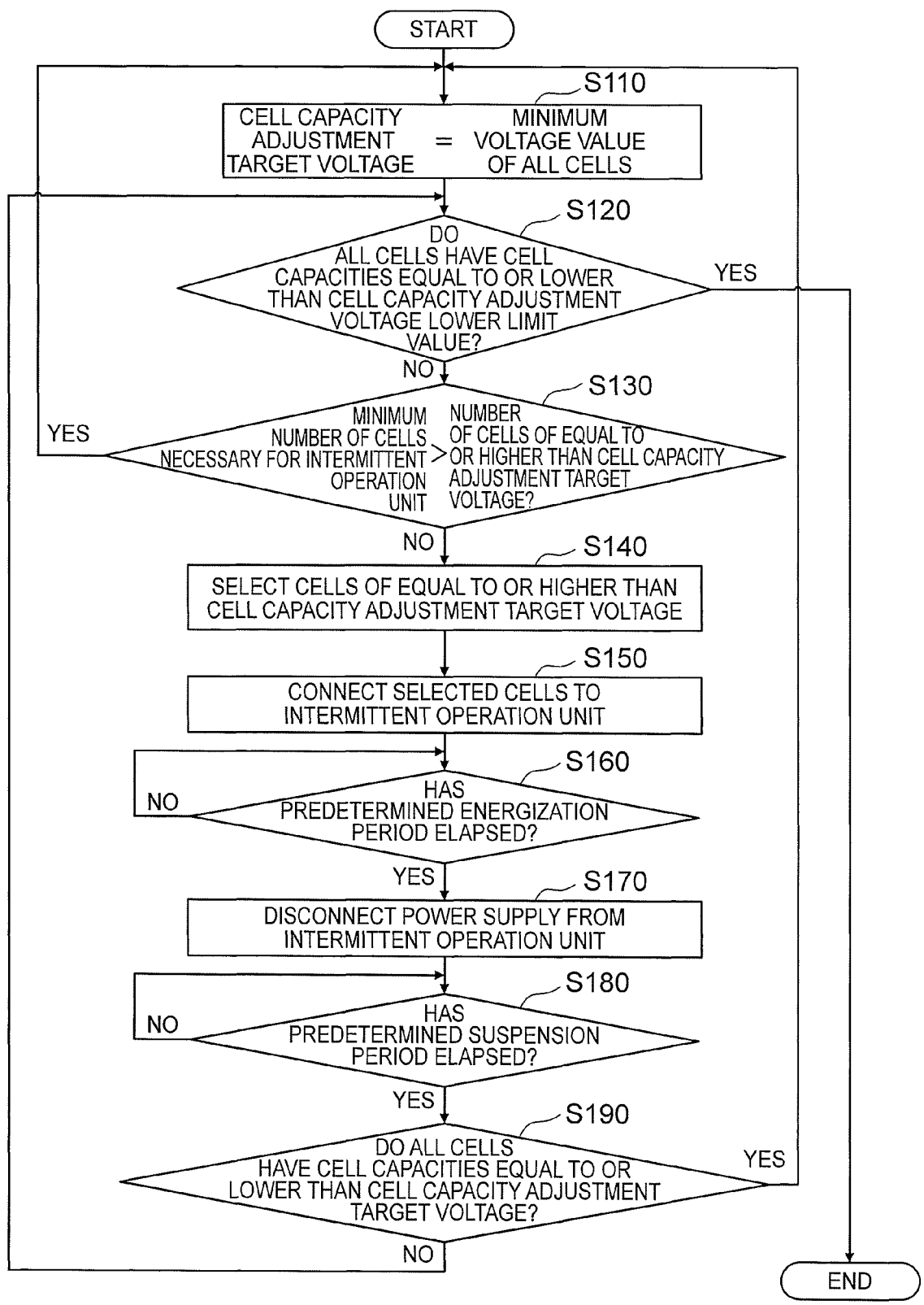
FIG. 2 A flowchart illustrating a flow of capacity adjustment control in the cell capacity adjusting device according to the first embodiment of the present invention.

FIG. 2 is a flowchart illustrating an example of the operation for reducing the fluctuations in state of charge (SOC) among the cells in the cell capacity adjusting device according to the first embodiment of the present invention. The flow illustrated in FIG. 2 is carried out during vehicle parking, during which the main switch 102 is turned OFF and no power is supplied to the load 103.

First, in Step S110, the cell controller 104 detects open-circuit voltages of all the cells 111 to 116 of the battery pack 101 by the cell voltage detection circuit. Next, the cell controller 104 sets a minimum voltage value of the detected open-circuit voltages as a cell capacity adjustment target voltage. Note that, the cell capacity adjustment target voltage as used herein is a minimum voltage value, but the cell capacity adjustment target voltage is not limited thereto and may be any voltage value excluding a maximum voltage value.

Next, in Step S120, the cell controller 104 determines whether or not the open-circuit voltage values of all the cells 111 to 116 are equal to or lower than a predetermined cell capacity adjustment voltage lower limit value. The cell capacity adjustment voltage lower limit value is calculated in advance based on a predetermined voltage lower limit value of each of the cells 111 to 116 of the battery pack 101. For example, the cell capacity adjustment voltage lower limit value is calculated as a voltage value exhibited when a capacity necessary for each of the cells 111 to 116 to operate the intermittent operation unit 105 once remains therein. As a result of the determination of Step S120, when it is determined that the voltage values of all the cells 111 to 116 are equal to or lower than the cell capacity adjustment voltage lower limit value (namely, "YES"), the cell capacity adjustment control is finished because the battery pack 101 will be overdischarged if the battery pack 101 is further discharged. On the other hand, when it is determined that the voltage values of all the cells 111 to 116 are not equal to or lower than the cell capacity adjustment voltage lower limit value (namely, "No"), the process proceeds to Step S130. Note that, the cell capacity adjustment voltage lower limit value in this case is set as a voltage exhibited when a capacity necessary for operating the intermittent operation unit 105 once remains in the cells, but the cell capacity adjustment voltage lower limit value is not limited thereto and may be any lower limit value which is determined so as to prevent the battery pack 101 from being overdischarged.

Next, in Step S130, the cell controller 104 determines whether or not the minimum number of cells necessary for causing the intermittent operation unit 105 to operate is larger than the number of cells having a voltage value equal to or higher than the cell capacity adjustment target voltage. As a result, when it is determined that the minimum number of cells necessary for causing the intermittent operation unit 105 to operate is larger than the number of cells having a voltage value equal to or higher than the cell capacity adjustment target voltage (namely, "YES"), the process returns to Step S110, and the cell controller 104 resets the cell capacity adjustment target voltage. On the other hand, when it is determined that the minimum number of cells necessary for causing the intermittent operation unit 105 to operate is smaller than the number of cells having a voltage value equal to or higher than the cell capacity adjustment target voltage (namely, "NO"), the process proceeds to Step S140.

Next, in Step S140, the cell controller 104 selects a predetermined number of cells having a voltage value equal to or higher than the cell capacity adjustment target voltage from among the cells 111 to 116, the predetermined number being one or more. Here, an example that the predetermined number of cells to be selected is three is explained. Note that, the example that the predetermined number of cells to be selected is three is explained, but the number is not limited thereto and may be any number of one or more as long as power for causing the intermittent operation unit 105 to operate can be supplied.

In the next Step S150, the cell controller 104 connects the three cells selected in the preceding Step S140 to the intermittent operation unit 105. For example, when the cells 111, 113, and 114 are selected, the cell controller 104 turns on the switches 201, 203, 204, 212, 215, and 216. That is, the cell controller 104 turns on the switches which are connected in series to the selected cells, turns on the switches which are connected in parallel to the unselected cells, and leaves the other switches to be off. At the same time, the cell controller 104 connects the switch 200 to the battery pack 101 side so that power may be supplied from the battery pack 101 to the intermittent operation unit 105.

Next, in Step S160, the cell controller 104 determines whether or not a predetermined energization period has elapsed. When the predetermined energization period has not elapsed (namely, "NO"), the cell controller 104 continues supplying power to the intermittent operation unit 105 by the selected cells until the predetermined energization period has elapsed. On the other hand, when it is determined that the predetermined energization period has elapsed (namely, "YES"), the process proceeds to Step S170.

In Step S170, the cell controller 104 disconnects the cells which have been connected to the intermittent operation unit 105 in the preceding Step S150 (in the example above, the cells 111, 113, and 114), to thereby suspend power supply to the intermittent operation unit 105.

Next, in Step S180, the cell controller 104 determines whether or not a predetermined suspension period has elapsed. When the predetermined suspension period has not elapsed (namely, "NO"), the cell controller 104 waits until the predetermined suspension period has elapsed. On the other hand, when it is determined that the predetermined suspension period has elapsed (namely, "YES"), the process proceeds to Step S190.

Next, in Step S190, the cell controller 104 determines whether or not the voltage values of all the cells 111 to 116 are equal to or lower than the cell capacity adjustment target voltage. As a result of the determination, when it is determined that the voltage values of all the cells 111 to 116 are not equal to or lower than the cell capacity adjustment target voltage (namely, "NO"), the process proceeds to Step S120. On the other hand, when it is determined that the voltage values of all the cells 111 to 116 are equal to or lower than the cell capacity adjustment target voltage (namely, "YES"), the process returns to Step S110, and the cell controller 104 resets the cell capacity adjustment target voltage.

Figure 3:
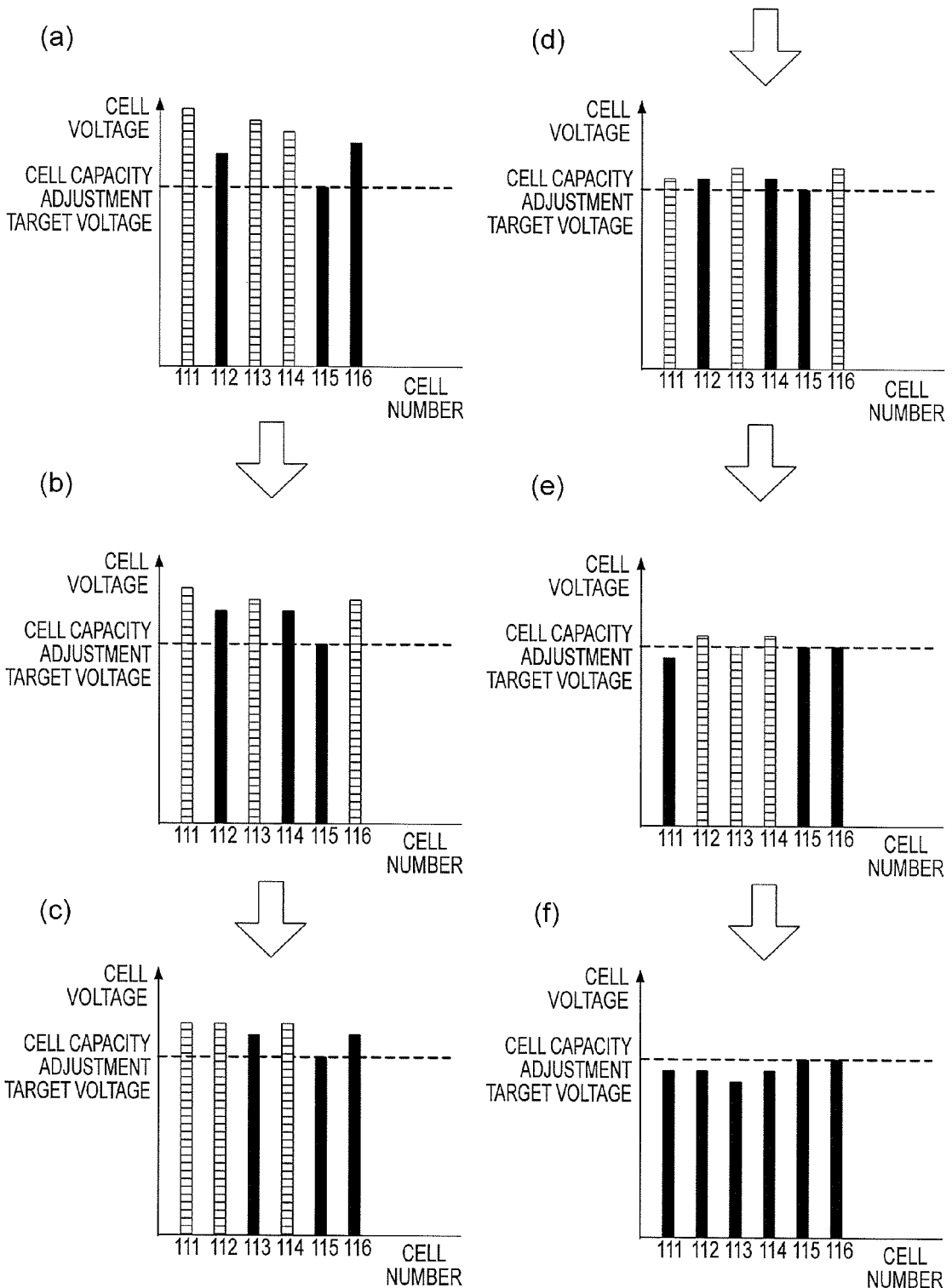
FIG. 3 Explanatory graphs showing a transition of each cell voltage during the capacity adjustment control by the cell capacity adjusting device according to the first embodiment of the present invention.

The transition of each cell voltage during the cell capacity adjustment control described above is shown in FIGS. 3(a) to 3(f), for example. In FIG. 3, symbols 111 to 116 on the horizontal axis represent the respective cells 111 to 116 of FIG. 1, and the vertical axis represents a voltage value.

First, the case where the cell voltages are distributed as shown in FIG. 3(a) at the start of control is considered. In this case, the voltage value of the cell 115, which is the minimum voltage, is set as the cell capacity adjustment target voltage. Subsequently, cells having a voltage value equal to or higher than the cell capacity adjustment target voltage are selected from among the cells 111 to 114 and 116. Note that, on this occasion, it is desired to select a predetermined number of cells in decreasing order of voltage value. Assuming that the cells 111, 113, and 114 are selected, the switches 201, 203, 204, 212, 215, and 216 are turned on, to thereby connect the cells 111, 113, and 114 to the intermittent operation unit 105 to cause the intermittent operation unit 105 to operate.

When a predetermined energization period has elapsed since the start of the operation of the intermittent operation unit 105, the open-circuit voltages of the cells 111, 113, and 114 are reduced by power capacities consumed by the intermittent operation unit 105. Therefore, the cell voltages are distributed as shown in FIG. 3(b). Even at this time, the voltage values of all the cells 111 to 116 are not yet equal to or lower than the cell capacity adjustment target voltage. Therefore, after a predetermined suspension period has elapsed, in order to continue the cell capacity adjustment control, cells having a voltage value equal to or higher than the cell capacity adjustment target voltage are selected again. Also in this case, it is desired to select a predetermined number of cells in decreasing order of voltage value. Therefore, in this case, the cells 111, 113, and 116 are selected, and those cells are connected to the intermittent operation unit 105 to cause the intermittent operation unit 105 to operate, resulting in the state of FIG. 3(c). Note that, the switches which are turned on at this time are the switches 201, 203, 206, 212, 214, and 215.

By the same procedure, in FIG. 3(c), the cells 111, 112, and 114 are selected. Subsequently, in FIG. 3(d), the cells 111, 113, and 116 are selected. Further, in FIG. 3(e), the cells 112, 113, and 114 are selected. In this manner, the intermittent operation unit 105 is caused to operate with the use of the selected cells, and then the cell voltages are distributed as shown in FIG. 3(f). In FIG. 3(f), the voltage values of all the cells 111 to 116 are equal to or lower than the cell capacity adjustment target voltage. Note that, as shown in FIG. 3(f), there remain fluctuations in voltage value among cells by an amount corresponding to one operation of the intermittent operation unit 105, but actually, the intermittent operation unit 105 is a unit with low power consumption and one operation reduces an open-circuit voltage a little, and hence the fluctuations are reduced to such an extent that the occurrence of overdischarge and overcharge can be prevented.

As described above, according to the first embodiment of the present invention, one or a plurality of cells are selected from among cells having a voltage value equal to or higher than the cell capacity adjustment target voltage, and power is supplied from the selected cells to the intermittent operation unit 105 to repeat an intermittent operation, and hence the fluctuations in state of charge (SOC) among cells can be reduced without unnecessarily discharging energy of the battery pack 101 and while making effective use of battery stored energy of the battery pack. In addition, the capacity adjustment control is finished when the voltage values of all the cells become equal to or lower than the cell capacity adjustment voltage lower limit value, and hence overdischarge of the battery pack 101 can be prevented.

Note that, when it is determined in the preceding Step S190 that the voltage values of all the cells are equal to or lower than the cell capacity adjustment target voltage (namely "YES"), the cell capacity adjustment control may be finished because the fluctuations in state of charge (SOC) among cells have been reduced at this time. In this case, if the cell controller 104 switches the switch 200 so that power necessary for the intermittent operation unit 105 may be supplied from the auxiliary battery 106, the intermittent operation unit 105 can be continued to be used.

Second Embodiment

Figure 4:
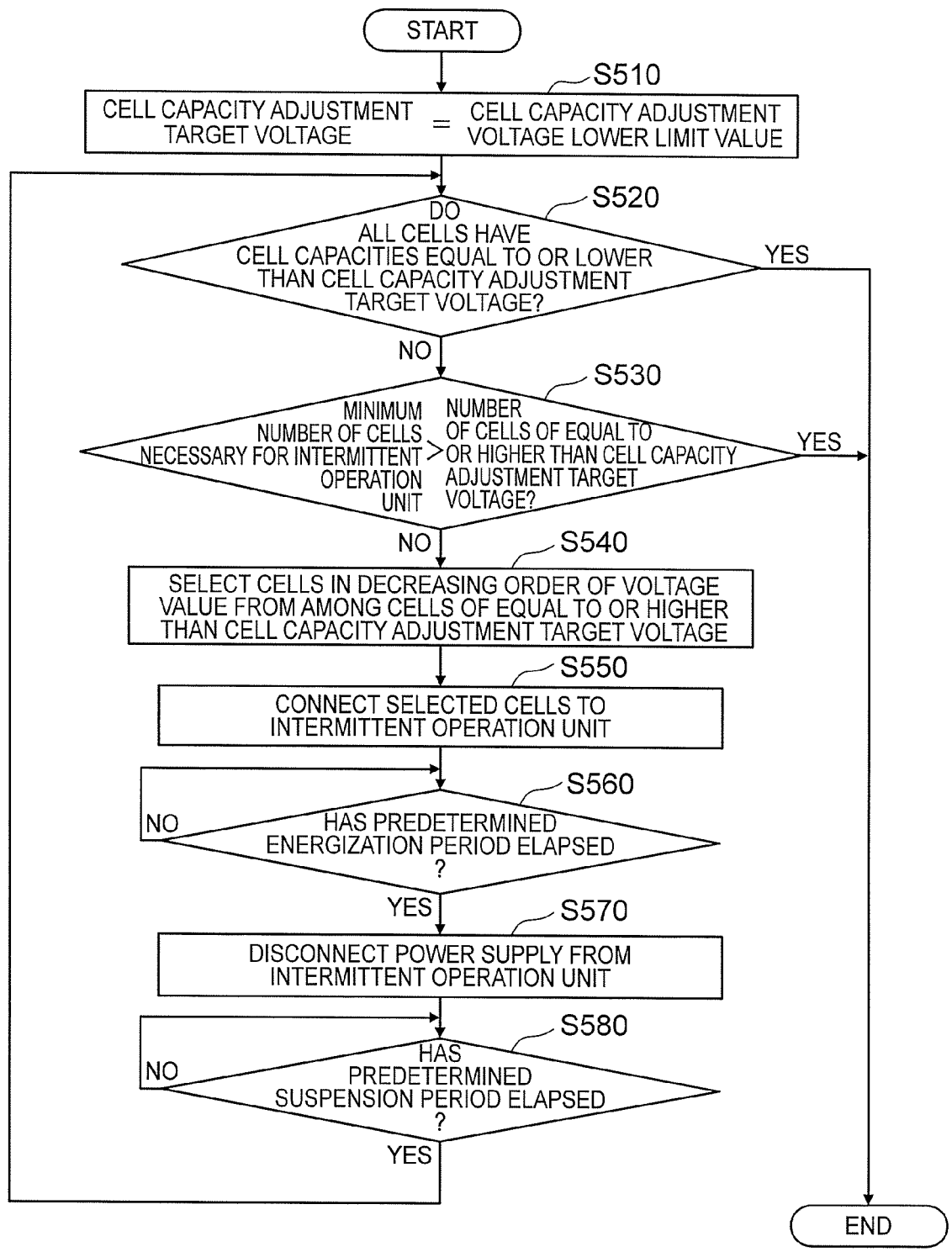
FIG. 4 A flowchart illustrating a flow of capacity adjustment control in the cell capacity adjusting device according to the second embodiment of the present invention.

A cell capacity adjusting device according to a second embodiment of the present invention is described with reference to a flowchart illustrated in FIG. 4. Note that, the cell capacity adjusting device according to the second embodiment of the present invention has the same configuration as that of the first embodiment illustrated in FIG. 1 described above. Therefore, the configuration of the cell capacity adjusting device is understood by reference to FIG. 1, and description thereof is omitted herein.

In Step S510, the cell controller 104 sets a cell capacity adjustment voltage lower limit value, which is calculated based on a predetermined voltage lower limit value of each of the cells 111 to 116 of the battery pack 101, as a cell capacity adjustment target voltage. That is, similarly to the first embodiment, for example, the cell capacity adjustment voltage lower limit value is set as a voltage exhibited when a capacity necessary for each of the cells 111 to 116 to operate the intermittent operation unit once remains therein.

Next, in Step S520, the cell controller 104 determines whether or not the voltage values of all the cells 111 to 116 are equal to or lower than the cell capacity adjustment target voltage. As a result of the determination, when it is determined that the voltage values of all the cells are not equal to or lower than the cell capacity adjustment target voltage (namely, "NO"), the process proceeds to Step S530. On the other hand, when it is determined that the voltage values of all the cells are equal to or lower than the cell capacity adjustment target voltage (namely, "YES"), the cell capacity adjustment control is finished because the cell capacity adjustment target voltage in this embodiment is the cell capacity adjustment voltage lower limit value as described above and hence the battery pack 101 will be overdischarged if the battery pack 101 is further discharged.

Next, in Step S530, the cell controller 104 determines whether or not the minimum number of cells necessary for causing the intermittent operation unit 105 to operate is larger than the number of cells having a voltage equal to or higher than the cell capacity adjustment target voltage. As a result of the determination, when it is determined that the minimum number of cells necessary for causing the intermittent operation unit 105 to operate is smaller than the number of cells having a voltage equal to or higher than the cell capacity adjustment target voltage (namely, "NO"), the process proceeds to Step S540. On the other hand, when it is determined that the minimum number of cells necessary for causing the intermittent operation unit 105 to operate is larger than the number of cells having a voltage equal to or higher than the cell capacity adjustment target voltage (namely, "YES"), the cell capacity adjustment control is finished because at least one of the selected cells will be overdischarged if the selected cells are further discharged.

Next, in Step S540, the cell controller 104 selects one or a plurality of cells from among the cells having a voltage value equal to or higher than the cell capacity adjustment target voltage in decreasing order of voltage value. Here, an example that the number of cells to be selected is three is explained. Note that, the example that the number of cells to be selected is three is explained, but the number is not limited thereto and may be any number of one or more as long as power for causing the intermittent operation unit 105 to operate can be supplied.

The processing of the next Step S550 is the same as the processing of Step S150 of the flowchart illustrated in FIG. 2. That is, the cell controller 104 connects the three cells selected in the preceding Step S540 to the intermittent operation unit 105. For example, when the cells 111, 113, and 114 are selected, the cell controller 104 turns on the switches 201, 203, 204, 212, 215, and 216, and connects the switch 200 to the battery pack 101 side so that power may be supplied from the battery pack 101 to the intermittent operation unit 105.

The processing of the next Step S560 is the same as the processing of Step S160 of the flowchart illustrated in FIG. 2. That is, the cell controller 104 determines whether or not a predetermined energization period has elapsed. When the predetermined energization period has not elapsed (namely, "NO"), the cell controller 104 continues supplying power to the intermittent operation unit 105 until the predetermined energization period has elapsed. On the other hand, when it is determined that the predetermined energization period has elapsed (namely, "YES"), the process proceeds to Step S570.

The processing of Step S570 is the same as the processing of Step S170 of the flowchart illustrated in FIG. 2. That is, the cell controller 104 disconnects the cells which have been connected to the intermittent operation unit 105 in the preceding Step S550, to thereby suspend power supply to the intermittent operation unit 105.

The processing of the next Step S580 is the same as the processing of Step S180 of the flowchart illustrated in FIG. 2. That is, the cell controller 104 determines whether or not a predetermined suspension period has elapsed. When the predetermined suspension period has not elapsed (namely, "NO"), the cell controller 104 waits until the predetermined suspension period has elapsed. On the other hand, when it is determined that the predetermined suspension period has elapsed (namely, "YES"), the process proceeds to Step S520.

The transition of each cell voltage during the cell capacity adjustment control described above is shown in FIGS. 5(p) to 5(s), for example. In FIG. 5, symbols 111 to 116 on the horizontal axis represent the respective cells 111 to 116 of FIG. 1, and the vertical axis represents a voltage value.

First, the cell capacity adjustment voltage lower limit value is set as the cell capacity adjustment target voltage. The case where the cell voltages are distributed as shown in FIG. 5(p) at the start of control is considered. From among cells having a voltage value equal to or higher than the cell capacity adjustment target voltage, three cells in decreasing order of voltage value, namely the cells 111, 113, and 114, are selected. That is, the switches 201, 203, 204, 212, 215, and 216 are turned on, to thereby connect the cells 111, 113, and 114 to the intermittent operation unit 105 to cause the intermittent operation unit 105 to operate. When a predetermined energization period has elapsed since the start of the operation of the intermittent operation unit 105, the open-circuit voltages of the cells 111, 113, and 114 are reduced by power capacities consumed by the intermittent operation unit 105. Thus, the cell voltages are distributed as shown in FIG. 5(q). However, the voltage values of all the cells are not yet equal to or lower than the cell capacity adjustment target voltage, and therefore, after a predetermined suspension period has elapsed, the cell capacity adjustment control is continued. That is, from among cells having a voltage value equal to or higher than the cell capacity adjustment target voltage, three cells 111, 113, and 116 in decreasing order of voltage value are selected and connected to the intermittent operation unit 105 to cause the intermittent operation unit 105 to operate. This results in FIG. 5(r). Note that, the switches which are turned on at this time are the switches 201, 203, 206, 212, 214, and 215. By the same procedure, in FIG. 5(r), the cells 111, 112, and 114 are selected to cause the intermittent operation unit 105 to operate, and then the cell voltages are distributed as shown in FIG. 5(s). In this manner, the fluctuations in state of charge (SOC) among cells can be reduced.

As described above, according to the second embodiment of the present invention, the same effect as the above-mentioned effect of the first embodiment can be obtained, and further, the cell capacity adjustment target voltage is set as the cell capacity adjustment voltage lower limit value so as not to repeatedly reset the cell capacity adjustment target voltage, and hence there is another effect that the fluctuations instate of charge (SOC) among cells can be reduced while simplifying the control method. In addition, the cell capacity adjustment control is finished when the minimum number of cells necessary for causing the intermittent operation unit 105 to operate becomes larger than the number of cells having a voltage value equal to or higher than the cell capacity adjustment voltage lower limit value, and hence overdischarge of the battery pack 101 can be prevented.

Note that, although not illustrated in the flowcharts of the first and second embodiments described above, when the main switch 102 is turned on, the switch 200 is disconnected from the battery pack 101 side, and the cell capacity adjustment control is finished.

Further, the first and second embodiments described above have exemplified the configuration of the battery pack 101 in which six cells are connected in series, but the application of the present invention is not limited to this configuration. For example, the present invention is similarly applicable to cell capacity adjustment control for a secondary battery in which any two or more plurality of cells are connected in series or in series and in parallel. Note that, the battery pack 101 described above has been exemplified as a lithium-ion battery, but any battery in which there is a certain proportional relationship between a state of charge (SOC) and an open-circuit voltage can be applied.

Further, the first and second embodiments have exemplified the case where the present invention is applied to an electric vehicle. However, it should be understood that the present invention is applicable not only to an electric vehicle but also to a system whose main power source is a secondary battery formed by connecting any two or more plurality of cells in series or in series and in parallel.

REFERENCE SIGNS LIST

101 battery pack, 102 main switch, 103 load, 104 cell controller, 105 intermittent operation unit, 106 auxiliary battery, 111, 112, 113, 114, 115, 116 cell, 200, 201, 202, 203, 204, 205, 206, 211, 212, 213, 214, 215, 216 switch

The invention claimed is:

1. A cell capacity adjusting device for reducing fluctuations in state of charge (SOC) among cells of a battery pack, which is formed by connecting a plurality of cells in series, during suspension of operation of electrically-powered equipment whose main power source is the battery pack,
the cell capacity adjusting device comprising:
cell capacity target value setting means for setting a cell capacity adjustment target voltage;
cell selection means for detecting an open-circuit voltage of each of the cells of the battery pack, selecting a predetermined number of cells from among the cells having a voltage value equal to or higher than the cell capacity adjustment target voltage, and comparing the predetermined number of cells with a minimum number of cells necessary for operation of an intermittent operation unit which operates even during the suspension of the operation of the electrically-powered equipment;
cell connection switch means for connecting the predetermined number of cells selected by the cell selection means to the intermittent operation unit, thereby supplying power from the selected predetermined number of cells to the intermittent operation unit; and
intermittent operation control means for repeating turning ON and OFF the cell connection switch means every predetermined period, thereby causing the intermittent operation unit to perform an intermittent operation,
wherein the intermittent operation of the intermittent operation unit is repeated until voltage values of all the cells become equal to or lower than the cell capacity adjustment target voltage during the suspension of the operation of the electrically-powered equipment, and
wherein, in response to determining that the minimum number of cells necessary for operation of the intermittent operation unit is larger than the predetermined number of cells, the cell capacity target value setting means resets the cell capacity adjustment target voltage to a new target value.

2. The cell capacity adjusting device according to claim 1, wherein the cell capacity target value setting means sets any voltage value excluding a maximum voltage value of the open-circuit voltages of the cells as the cell capacity adjustment target voltage.

3. The cell capacity adjusting device according to claim 2, wherein, when the voltage values of all the cells become equal to or lower than the cell capacity adjustment target voltage, the cell capacity target value setting means sets any voltage value excluding a maximum voltage value of the open-circuit voltages of the cells as the cell capacity adjustment target voltage again.

4. The cell capacity adjusting device according to claim 1, wherein:
the cell capacity target value setting means sets a cell capacity adjustment voltage lower limit value, which is calculated based on a predetermined voltage lower limit value of the each of the cells of the battery pack, as the cell capacity adjustment target voltage; and
the cell selection means detects the open-circuit voltage of the each of the cells, and selects a predetermined number of cells from among the cells having a voltage value equal to or higher than the cell capacity adjustment target voltage in decreasing order of voltage value.

5. The cell capacity adjusting device according to claim 1, wherein the intermittent operation control means suspends the intermittent operation of the unit when a number of cells having a voltage value equal to or lower than a voltage lower limit value which is determined for each of the cells exceeds a predetermined value.

6. The cell capacity adjusting device according to claim 1, wherein the intermittent operation unit comprises a vehicle security unit and a keyless entry unit which operates even during suspension of operation of the vehicle.

7. The cell capacity adjusting device according to claim 1, wherein each of the plurality of cells is connected in series to a switch and connected in parallel to another switch, and when supplying power to the intermittent operation unit, the cell connection switch means turns on switches that are connected in series to the selected cells, and turns on the switches that are connected in parallel to unselected cells, and leaves other switches to be off.

* * * * *